(12) United States Patent
Vickroy

(10) Patent No.: US 7,553,379 B2
(45) Date of Patent: Jun. 30, 2009

(54) APPARATUS AND METHOD FOR REMOVING DEBRIS FROM A TOOL

(75) Inventor: Samuel C. Vickroy, Madison, AL (US)

(73) Assignee: SCV Quality Solutions, LLC, Madison, AL (US)

( * ) Notice: Subject to any disclaimer, the term of this patent is extended or adjusted under 35 U.S.C. 154(b) by 760 days.

(21) Appl. No.: 11/057,800

(22) Filed: Feb. 14, 2005

(65) Prior Publication Data

US 2006/0180178 A1  Aug. 17, 2006

(51) Int. Cl.
  *B08B 1/00* (2006.01)
(52) U.S. Cl. ......................................................... 134/6
(58) Field of Classification Search ............... 15/236.01, 15/236.07, 236.08, 236.09, 235.3, 235.7, 15/245.1; 134/6; 294/51
  See application file for complete search history.

(56) References Cited

U.S. PATENT DOCUMENTS

| | | | | |
|---|---|---|---|---|
| 1,184,821 A | * | 5/1916 | Cantley | 294/51 |
| 2,046,334 A | * | 7/1936 | Loeber | 30/169 |
| 2,947,370 A | * | 8/1960 | Nelson | 172/375 |
| 3,408,677 A | * | 11/1968 | Yates | 15/236.02 |
| 3,865,370 A | * | 2/1975 | Rogers | 30/165 |
| D246,345 S | * | 11/1977 | Poncia | D8/14 |
| 4,670,987 A | * | 6/1987 | Casey, Jr. | 30/443 |
| D330,665 S | * | 11/1992 | Neuendorf | D7/693 |
| 5,272,782 A | * | 12/1993 | Hutt | 15/105 |
| 5,272,786 A | * | 12/1993 | Edstrom | 15/236.07 |
| D352,426 S | * | 11/1994 | Tucker | D7/696 |
| 6,115,874 A | * | 9/2000 | Camilleri et al. | 15/236.08 |
| 6,851,215 B2 | * | 2/2005 | Conrad | 43/17.2 |

* cited by examiner

*Primary Examiner*—Randall Chin
(74) *Attorney, Agent, or Firm*—Ann I. Dennen; Lanier Ford Shaver & Payne P.C.

(57) ABSTRACT

An apparatus for removing debris from a tool has a head, and the head has a tool-shaped opening with an inner wall. The apparatus further has a blunt point contiguous with the head for inserting into the ground such that a tool in the shape of the opening can be inserted into the opening, contacted with the inner wall, and removed from the opening thereby removing unwanted debris from the tool.

4 Claims, 7 Drawing Sheets

APPARATUS AND METHOD FOR REMOVING DEBRIS FROM A TOOL

RELATED ART

Tools are used in landscaping and gardening for a variety of functions. Specifically, tools such as shovels, hoes, picks, and trowels are used to loosen ground and/or move dirt from one place to another.

In the course of using such tools to landscape and/or garden, debris, e.g., mud or rocks, may become affixed to the tools. In order to use the tools most effectively, it is oftentimes imperative to remove the debris from the tools before continuing with gardening and/or landscaping chores.

Oftentimes, one who is using a tool can use his foot to knock the debris off of the tool. Furthermore, he can knock the tool against a stationary object, e.g., a fence or a rock, to remove the debris.

However, such methods of removing debris from gardening tools are usually inefficient and oftentimes ineffective.

SUMMARY OF THE DISCLOSURE

Generally, the present disclosure provides an apparatus and method for removing debris from a tool.

An apparatus for removing debris from a tool has a head, and the head has a tool-shaped opening with an inner wall. The apparatus has a blunt point contiguous with the head for inserting into the ground such that a tool in the shape of the opening can be inserted into the opening, contacted with the inner wall, and removed from the opening thereby removing unwanted debris from the tool.

A method for removing debris from a tool in accordance with an exemplary embodiment of the present disclosure comprises the steps of providing a head having a tool-shaped opening, the tool-shaped opening having an inner wall. The method further comprises the step of providing a blunt point contiguous with the head such that the blunt point can be inserted into the ground exposing the opening of the head and such that a tool in the shape of the opening can be inserted into the opening, contacted with the inner wall, and removed from the opening thereby removing unwanted debris from the tool.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to an apparatus and method for removing debris from a garden tool. Particularly, an apparatus of the present disclosure provides a head having a debris removal opening, and the head is secured into the ground by driving the blunt point into the ground. A user of a garden tool inserts the garden tool into the opening then removes the garden tool from the opening, and as the tool is removed from the opening by the user, the apparatus removes unwanted debris, e.g., mud, gravel, grass, etc., that is attached to the garden tool.

Figure 1:
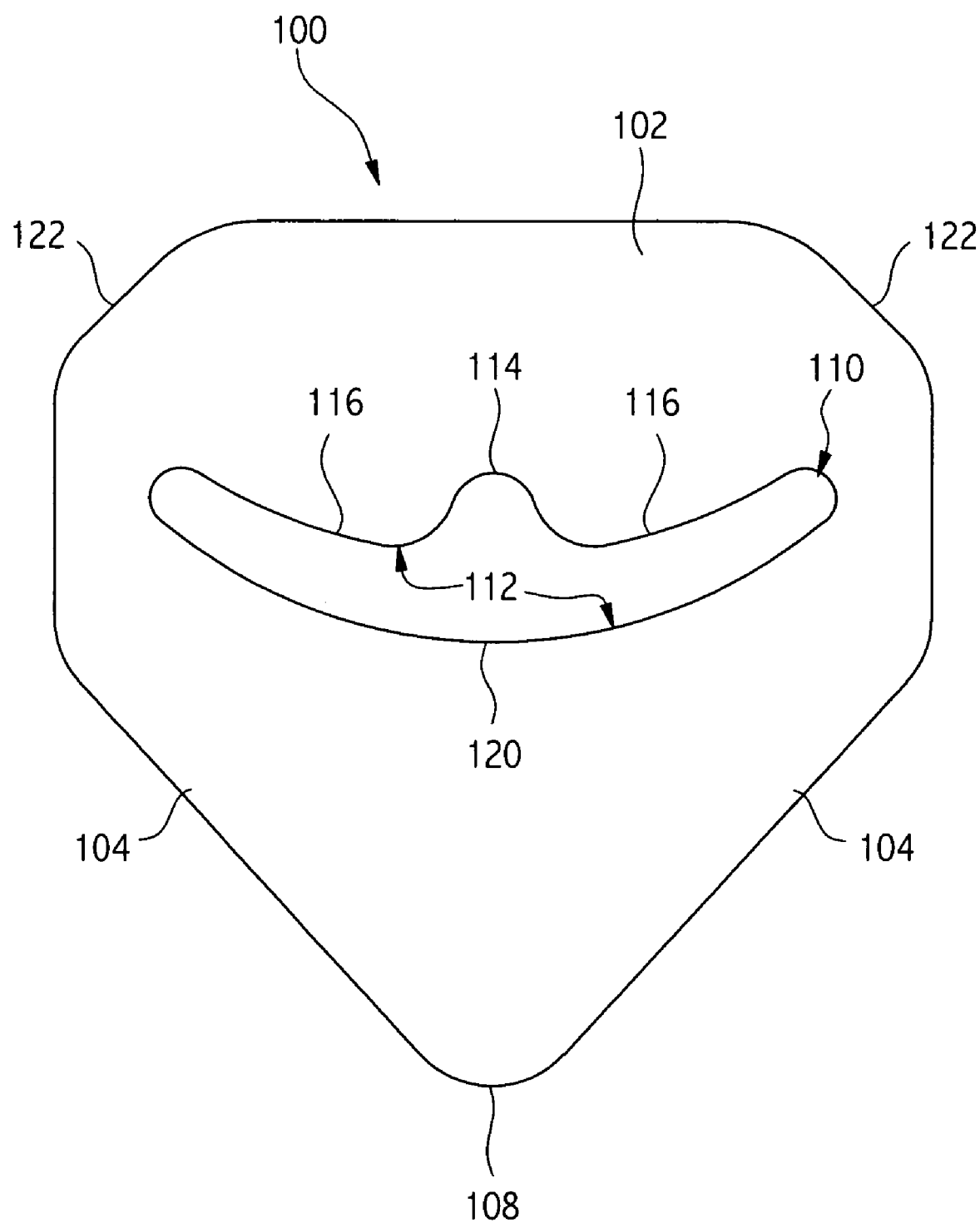
FIG. 1 is a tool scraper in accordance with an exemplary embodiment of the present disclosure.

A garden tool scraper 100 in accordance with an exemplary embodiment of the present disclosure is depicted in FIG. 1. The tool scraper 100 comprises a tool scraper head 102, a tapered body 104, and a blunt point 108.

The tool scraper head 102 comprises a tool-shaped opening 110 for receiving a garden tool that may be adulterated with unwanted debris. The exemplary tool-shaped opening 110 is particularly shaped for receiving, for example, a shovel head, described in more detail with reference to FIG. 2. However, other tool-shaped openings shaped to receive other tools, e.g., spades, trowels, hoes, or rakes, are possible in other embodiments.

In this regard, the tool-shaped opening 110 is defined by a lip 120, two symmetrical lips 116, and a notch 114 contiguous with and interposed between the two lips 116. Preferably, the direction of curvature of the projection 114 is opposite the direction of curvature of the curvatures 116.

As will be described with reference to FIG. 2, the lip 120, the lips 116, and the notch 114 combine to form a shape conducive to receiving a shovel blade.

Additionally, the opening 110 in defined by an inner wall 112 of the head 102. The inner wall 112 ensures that any debris attached to the shovel blade is scraped from the shovel blade when the shovel blade is removed from the opening 110, which will be described in more detail with reference to FIG. 2. In this regard, the shape of the opening 110 having the lip 120, the lips 116, and the notch 114, is such that when a shovel blade is retrieved from the opening, the lip 120, the lips 116, and the notch 114 can scrape debris from the shovel blade. In this regard, the tool-shaped opening 110 can receive different styles of shovel blades that are of different sizes.

The head 102 of the tool scraper 100 is connected to a tapered body 104 that tapers to a blunt point 108. The blunt point 108 is configured for insertion into the ground. Therefore, when the blunt point 108 is inserted into the ground, and force is applied to the head 102, the scraper 100 inserts securely into the ground. The opening 110 is then used in order to scrape debris from a garden tool while the scraper 100 remains securely in the ground while force is being applied.

Additionally, the head 102 of the tool scraper 100 comprises squared edges 122. Such edges 122 are described in more detail with reference to FIG. 5.

Figure 2:
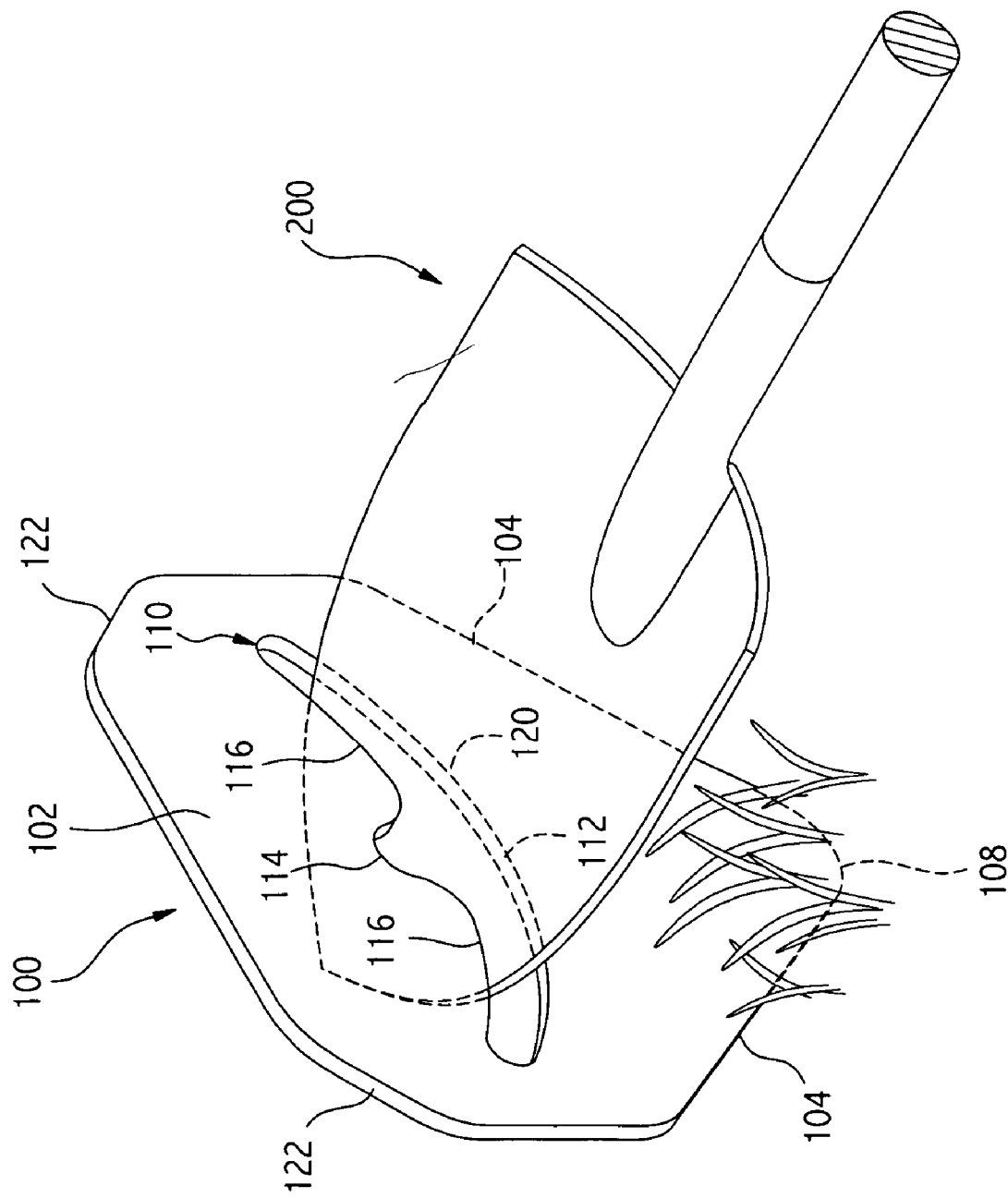
FIG. 2 is the tool scraper of FIG. 1 receiving a garden tool.

FIG. 2 depicts the scraper 100 inserted into the ground such that the tapered body 104 and the head 102 are exposed. Further, FIG. 2 depicts a shovel blade 200 inserted into the opening 110. The shovel blade 200 is inserted into the opening 110 and the opening 110 is shaped such that the curvature of the blade 200 substantially matches the opening 110.

Indeed, the shape of the opening 110 corresponds to the shape of the blade such that a substantial upper-side portion of the blade 200 contacts the inner wall 112 if the upper portion of the blade 200 is pushed against the lips 116 and the notch 114. Likewise, the shape of the opening 110 corresponds to the shape of the blade such that a substantial underside portion of the blade 200 contacts the inner wall 112 if the underside portion of the blade 200 is pushed against the lip 112.

As a result, as the blade 200 is being pulled through the opening 110 as it is being retrieved, debris on the blade 200 contacts the inner wall 112 and/or a side of the opening 110 causing any unwanted debris to be scraped from the blade.

Figure 3:
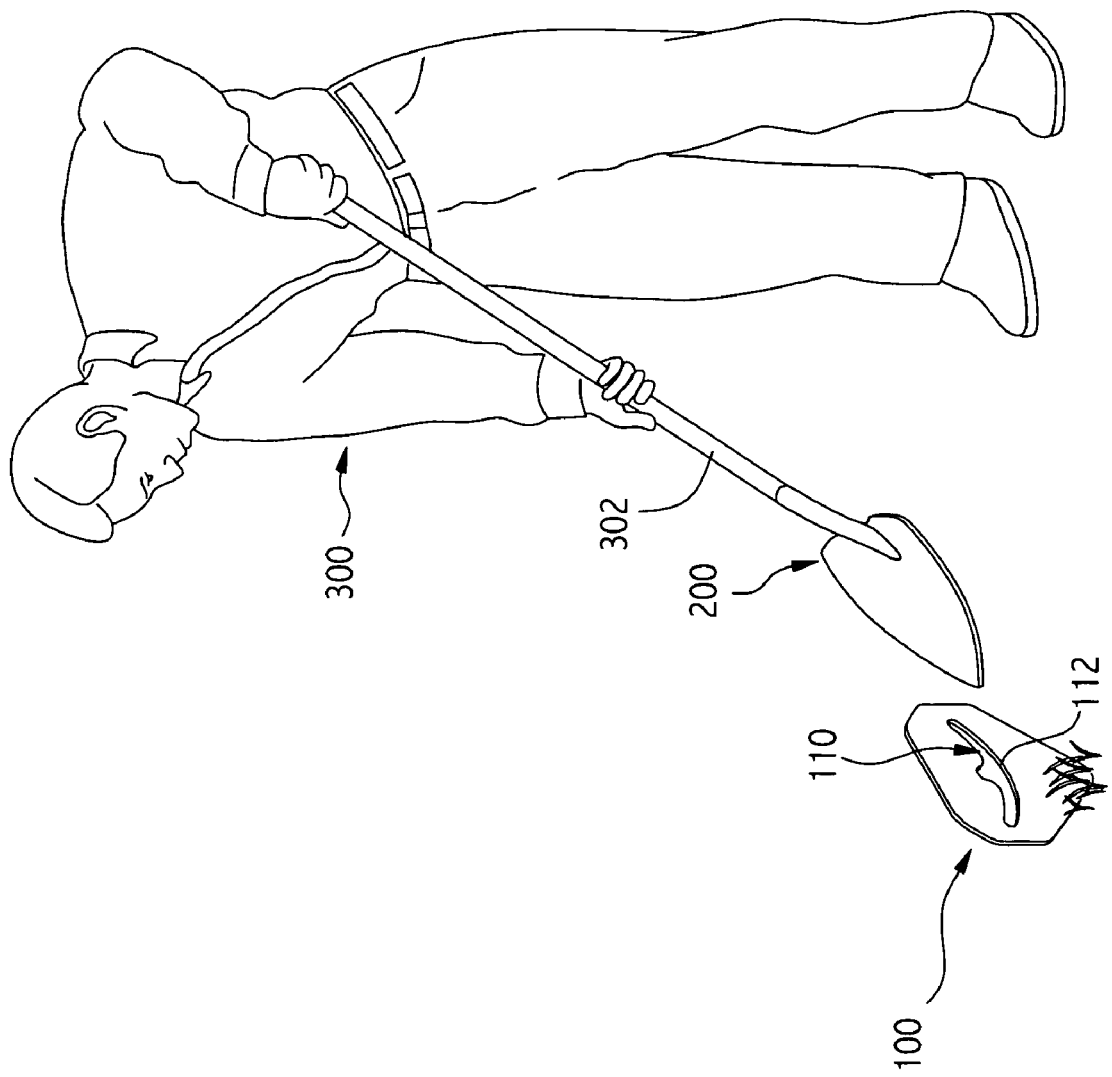
FIG. 3 is the tool scraper of FIG. 1 depicting a user inserting the garden tool of FIG. 2 into the shovel scraper.

FIG. 3 depicts a user 300 inserting the shovel blade 200 into the opening 110. The user 300 inserts the blade 200 via the handle 302 into the opening 110. The user 300 then moves the blade 200, e.g., lifts the blade 200 or lowers the blade 200, in order to contact the upper-side or underside of the blade 200 with the inner wall 112 of the opening 110.

Such contact can be made with the upper portion of the opening comprising the curvatures 116 and the projection 114 with the cupped portion of the blade 200. Alternatively, if there is debris on the underside of the blade 200, the user 300 can move the shovel blade 200 such that the underside of the blade 200 makes contact with the inner wall 112 corresponding to the lip 120.

Figure 4:
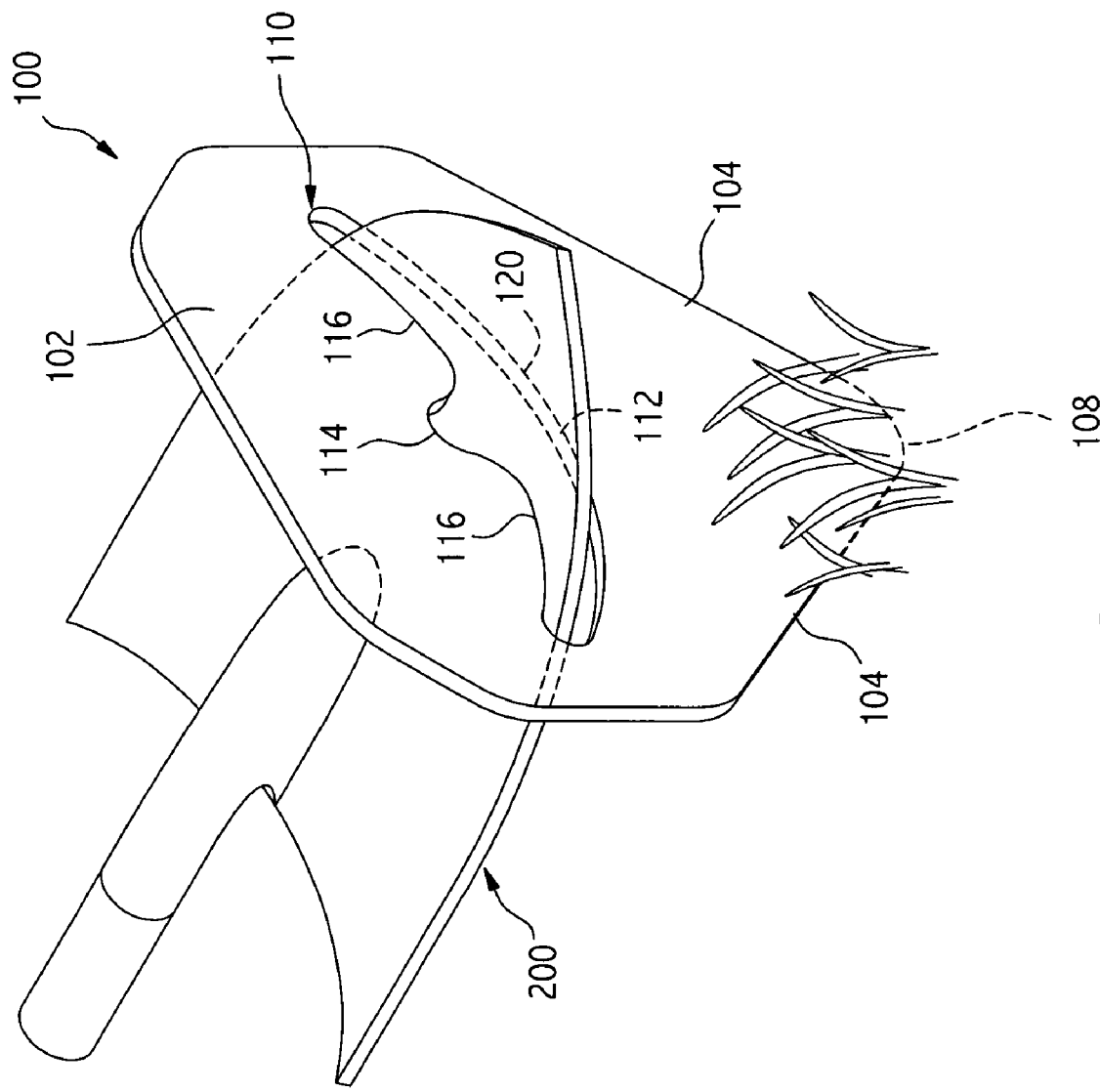
FIG. 4 is the a back perspective view of the tool scraper of FIG. 2.

FIG. 4 is a perspective view of the back side of the scraper 100 having a shovel blade 200 inserted therein. In this regard, after the user 300 inserts the blade 200 into the opening 110, the user then contacts the upper-side or underside of the blade 200 with the inner wall 112 of the opening 110.

Once the user 300 ensures that contact is made between the shove blade 200 and the inner wall 112, the user 300 removes the shovel blade 200 from the opening 110. As the user 300 is removing the blade 200 from the opening 110, the user 300 attempts to maintain contact between the blade 200 and the inner wall 112 of the opening 110 by continuing to push the blade 200 against the inner wall 112 as the blade 200 is being withdrawing from the opening 110.

Therefore, the inner wall 112 and/or the back of the scraper 100 scrapes off any debris that might be present on the cup of the blade 200 or on the underside of the blade 200.

Figure 5:
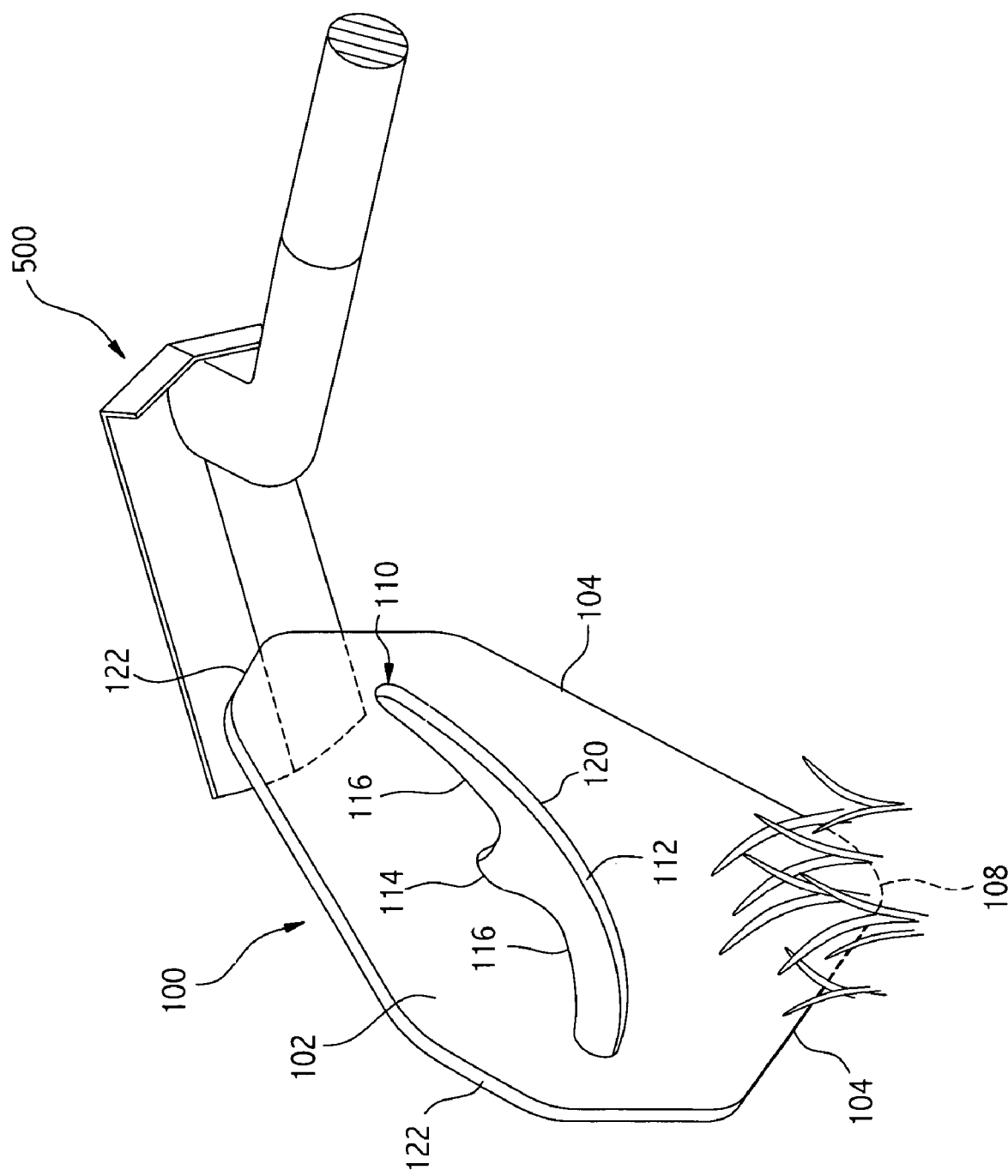
FIG. 5 is the tool scraper of FIG. 1 illustrating the use of the outer edge of the scraper.

FIG. 5 depicts another embodiment of the shovel scraper 100. As indicated herein, the head 102 of the scraper 100 comprises edges 122. Such edges are preferably shaped to receive a tool 500. In this regard, when the user 300 (FIG. 3) of the tool 500 desires to clean debris from the tool 500, the user 300 contacts the tool 500 with one of the edges 122. Because the edge 122 is shaped to receive the particular tool 500, it is effective for ridding the tool 500 from the undesired debris.

Notably, the tool 500 may be any type of gardening and/or landscaping tool known in the art. In this regard, the edge 122 may be shaped to receive one of the particular tools known in the art.

Figure 6:
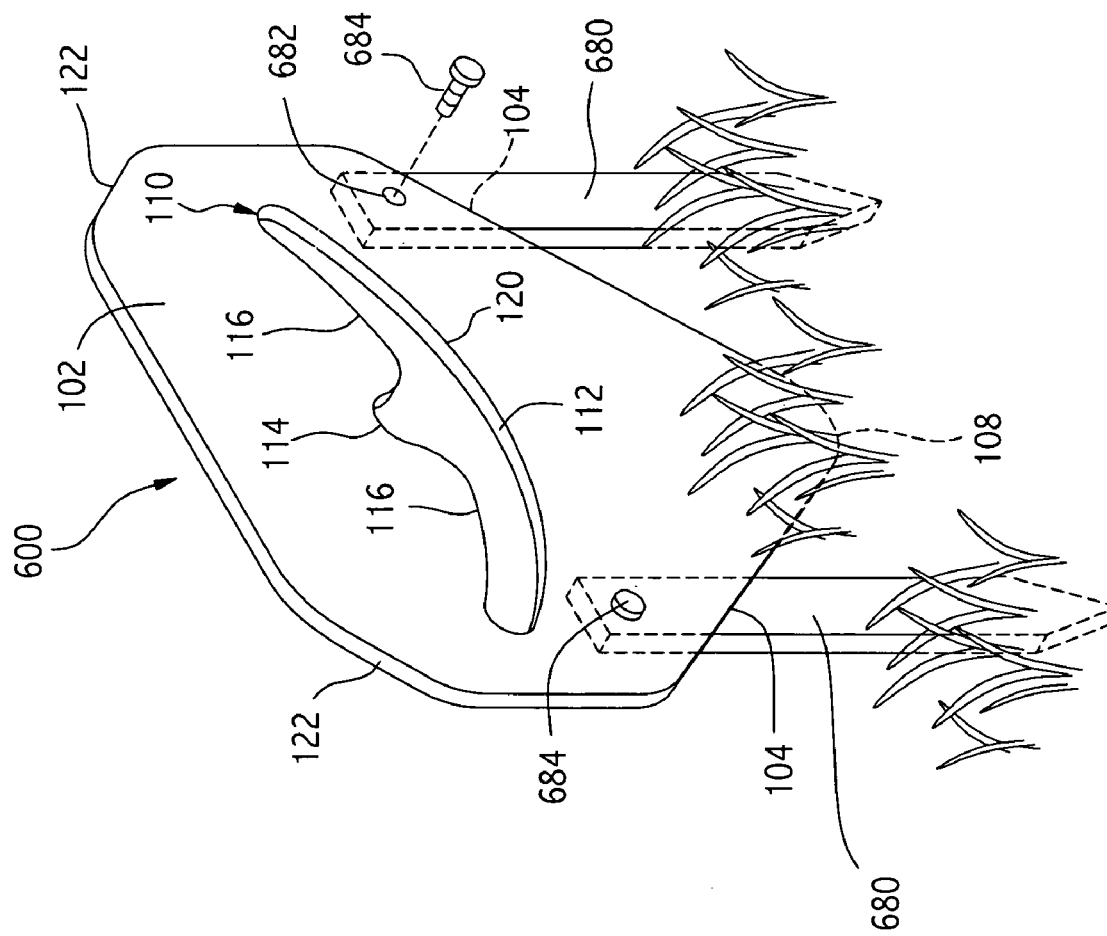
FIG. 6 is a embodiment of the scraper of FIG. 1 supported by a pair of stakes.

FIG. 6 depicts a shovel scraper 600 in accordance with another embodiment of the present disclosure. The shovel scraper 600 further comprises openings 682 in the scraper head 102. Such openings 682 are configured to receive an attachment implement 684, such as, for example, a nail or a screw. In this regard, the opening 628 may be threaded to receive a screw.

The scraper 600 may also have additional support utilizing a pair of stakes 680. The stakes 680 are secured to the head 102 by inserting the attachment implements 684 into the openings 682 and securing the implements 684 to the stakes 680. When the scraper 600 is inserted into the ground, the stakes 680 are inserted also. Thus, the stakes 680 provide additional support for the scraper 600 while the scraper 600 is in use.

Figure 7:
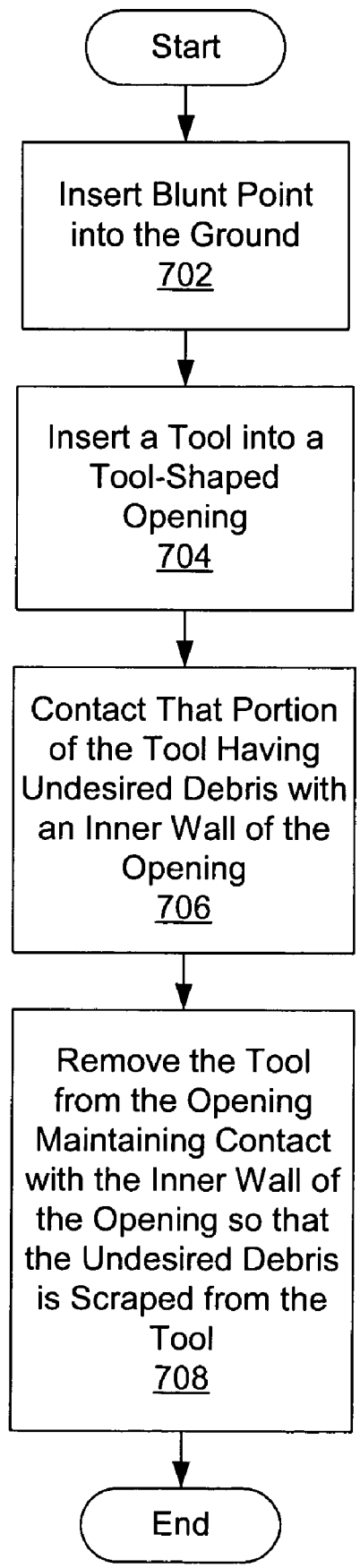
FIG. 7 is a flowchart illustrating a tool scraping method in accordance with an exemplary embodiment of the present disclosure.

FIG. 7 is a flowchart depicting a method of removing debris from a tool in accordance with an exemplary embodiment of the present disclosure.

In step 702 the user 300 (FIG. 3) inserts the scraper 100 (FIG. 1) into the ground by placing the blunt point 108 (FIG. 1) into the ground and applying force to the scraper 100.

When the user 300 determines that there is undesired debris on a tool that the user 300 is using, the user inserts the tool into the tool-shaped opening 110 (FIG. 1) of the scraper 100, in step 704. As noted herein, the tool may be a shovel blade 200 (FIG. 2), and the tool-shaped opening 110 may be shaped to receive and remove debris from the shovel blade 200.

The user 300 makes contact between the blade 200 and the inner wall 112 (FIG. 1) of the opening 110, as indicated in step 706. Such contact may be made by lifting the blade 200 so that the cup of the blade contacts that portion of the inner wall 112 defined by the lips 116 (FIG. 1) and possibly the notch 114 (FIG. 1). Thus, the user may desire to remove debris from the upper-side of the blade 200.

Alternatively, there may be debris on the underside of the blade 200. Therefore, the user may desire to establish contact between the underside of the blade 200 and that portion of the inner wall 112 defined by the lower lip 120. Such contact may be made by dropping the blade 200 so that the underside of the blade 200 contacts the lip 120.

The user 300 then removes the blade 200 from the opening 110 maintaining contact between the blade 200 and the inner wall 112 so that the inner wall 112 and/or a side of the scraper 100 scrapes the unwanted debris from the blade 200 in step 708.

The invention claimed is:

1. A method for removing debris from a tool, the method comprising the steps of:
   providing a head having a tool-shaped opening, the tool-shaped opening having an inner wall;
   providing a blunt point contiguous with the head such that the blunt point can be inserted into the ground exposing the opening of the head and such that a tool in the shape of the opening can be inserted into the opening, contacted with the inner wall, and removed from the opening thereby removing unwanted debris from the tool.

2. The method of claim 1, further comprising the step of providing a tapered body contiguous with the head and interposed between the head and the blunt point such that the width of the blunt point is less than that of the head for easy insertion into the ground.

3. The method of claim 2, further comprising the step of receiving a shovel blade.

4. The apparatus of claim 1, wherein the tool-shaped opening comprises a lower curvature, a pair of upper curvatures, and a projection interposed between the pair of curvatures.

* * * * *